United States Patent [19]

Gérard et al.

[11] Patent Number: 4,960,561
[45] Date of Patent: Oct. 2, 1990

[54] NUCLEAR REACTOR LOWER INTERNALS

[75] Inventors: Chevereau Gérard, Le Raincy; Michel Babin, Pantin, both of France

[73] Assignee: Framatome, Courbevoie, France

[21] Appl. No.: 308,499

[22] Filed: Feb. 10, 1989

[30] Foreign Application Priority Data

Feb. 11, 1988 [FR] France ................. 88 01646

[51] Int. Cl.⁵ .................. G21C 17/20; G21C 19/00
[52] U.S. Cl. .................... 376/352; 376/245; 376/254; 376/399; 376/463
[58] Field of Search ............... 376/353, 327, 399, 389, 376/377, 249, 263, 245, 352, 254, 255

[56] References Cited

U.S. PATENT DOCUMENTS

| | | | |
|---|---|---|---|
| 3,098,812 | 7/1963 | Treshow | 376/352 |
| 3,192,120 | 6/1965 | Campbell | 376/443 |
| 3,266,997 | 8/1966 | Hooper et al. | 376/352 |
| 3,623,948 | 11/1971 | Dotson et al. | 376/352 |
| 4,082,608 | 4/1978 | Curet | 376/352 |
| 4,432,931 | 2/1984 | Lockett | 376/249 |
| 4,457,890 | 7/1984 | Scott | 376/352 |
| 4,765,944 | 8/1988 | Heuze et al. | 376/254 |
| 4,775,510 | 10/1988 | Bryan | 376/443 |
| 4,818,470 | 4/1989 | Richardson et al. | 376/245 |
| 4,842,813 | 6/1989 | Desfontaines et al. | 3767353 |

FOREIGN PATENT DOCUMENTS

| | | | |
|---|---|---|---|
| 3118235 | 11/1982 | Fed. Rep. of Germany | 376/254 |
| 0047095 | 4/1979 | Japan | 376/254 |
| 1218992 | 9/1986 | Japan | 376/254 |

Primary Examiner—Harvey E. Behrend
Attorney, Agent, or Firm—Pollock, Vande Sande & Priddy

[57] ABSTRACT

Lower internals for a reactor—typically a PWR—having a pressure vessel containing a core cooled by an upward flow of coolant and a core support include a shell defining a coolant volume between the support plate and the lower part of the vessel. The shell has a wall and ducts opening into passages of the support plate. Guide tubes passing through the volume receive glove fingers for in-core instrumentation probes. The internals further include a separation plate fixed to the wall means, situated below the core support plate. The separation plate is formed with holes connected to the coolant conveying ducts and is fixed to the lower support plate of the core by mechanical connection means spaced apart at the periphery of the separation plate and defining passages for radial access of the coolant to the distribution chamber.

7 Claims, 3 Drawing Sheets

NUCLEAR REACTOR LOWER INTERNALS

BACKGROUND OF THE INVENTION

1. Technical Field

The invention relates to lower internals for nuclear reactors; it is particularly suitable for use in pressurized water nuclear reactors (PWRs).

However, the invention is also applicable to other types of reactors, particularly those of the type comprising a vessel withstanding the pressure of a coolant; a core formed of upstanding fuel assemblies carried by a lower support plate formed with passages for the upward flow of coolant; separation means defining a volume located between the support plate and a lower portion of the vessel, said separation means having a wall and ducts for conveying coolant to said passages through the wall and the volume; and guide tubes passing through the volume for guiding glove fingers for in-core instrumentation probes.

2. Prior Art

Different lower internals for nuclear reactors are already known. U.S. Pat. No. 4,842,813 describes lower internals of the above-described type. In such internals, the distribution of the guide tubes for the instrumentation probe "glove fingers" in the volume placed in the lower portion of the reactor vessel is complex when the number of coolant conveying ducts is high.

SUMMARY OF THE INVENTION

It is an object of the invention to provide improved lower internals for a reactor. It is a more specific object to facilitate respective distribution of the networks of guide tubes for the "glove fingers" of coolant conveying ducts. Another object is to reduce the head losses impressed on the coolant upstream of the core, particularly in the coolant conveying ducts and those due to the abrupt changes in the direction of the coolant flowing from an annulus about the core.

To this end, lower internals for a nuclear reactor further include a separation plate fixed to the wall means, situated below the core support plate, said separation plate being formed with holes connected to the coolant conveying ducts and being fixed to the lower support plate of the core by mechanical connection means spaced apart at the periphery of the separation plate and defining passages for radial access of the coolant to the distribution chamber.

There is consequently:

an improved distribution of the respective networks of glove finger guide tubes and ducts conveying coolant towards the core inside the shell of the lower internal equipment, an improved coolant supply for the fuel assemblies of the core situated at the periphery thereof;

easier shell construction.

In an advantageous embodiment, the mechanical connection means are formed as bars shaped for limiting the head loss of the coolant and/or arranged for protecting the guide tubes against coolant flow before they enter the volume.

The ducts projecting through the volume and delivering coolant to the distribution chamber may typically be spaced apart from each other by a distance equal to about 1.5 times the distance separating the axes of two adjacent fuel assemblies.

The invention will be better understood from the following description of a particular embodiment given by way of example only. The description refers to the accompanying drawings.

DETAILED DESCRIPTION OF A PREFERRED EMBODIMENT

Figure 1:
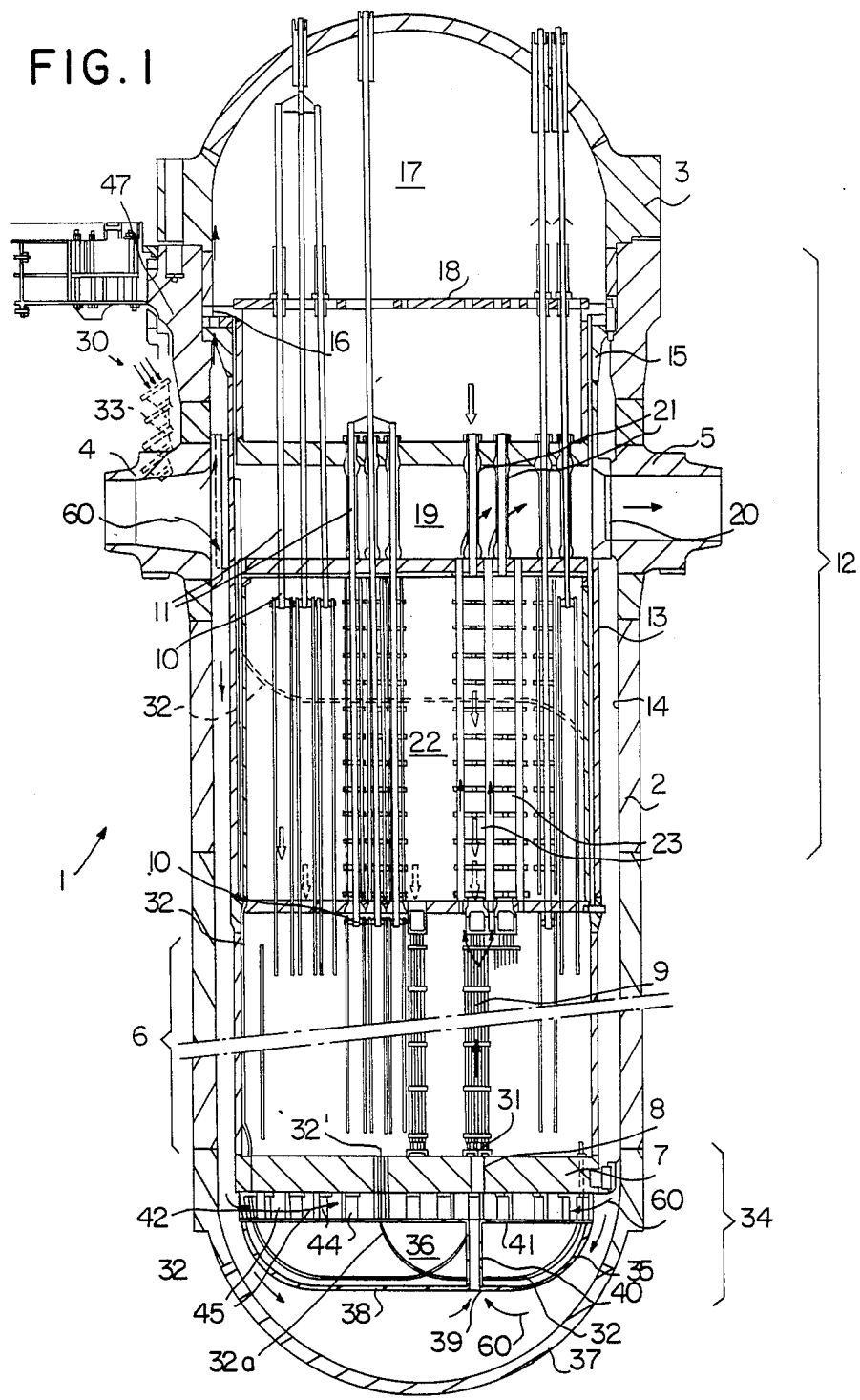
FIG. 1 is a general view of a reactor having lower internals in accordance with the invention, in vertical, cross-section.

Referring to FIG. 1, a pressurized water reactor 1 includes a pressure vessel 2 withstanding the pressure of a coolant, closed by a removable cover 3 and having coolant inlet nozzles 4 and coolant outlet nozzles 5. The reactor core 6 is carried by a lower support plate 7 formed with passage holes 8 allowing the coolant to flow upwardly into the upstanding fuel assemblies 9 of the core. Control clusters 10 actuated by drive shafts 11 projecting through the cover 3 of reactor 1 are provided for control.

The reactor further includes upper internals 12 interposed between core 6 and cover 3. The upper internals have an external cylindrical casing 13, radially spaced from the internal surface 14 of vessel 2 and having an upper flange 15 clamped between cover 3 and vessel 2 suspended to the vessel. The flow of coolant entering through nozzles 4 is directed into annulus along the inner surface 14 of the vessel 2 and later turns to penetrate into core 6 through the lower end of fuel assemblies 9.

Restricted passage means 16 by-pass flange 15 and provide a small coolant flow from the input nozzles 4 to a volume 17 defined by reactor cover 3 and by the upper part 18 of the upper internals 12 of the reactor.

A collection or plenum assembly 19 collects the coolant leaving the core and leads it transversely toward the outlet nozzles 5 after it has traversed the cylindrical casing 13 via holes 20 in line with the outlet nozzles 5; from the outlet nozzles, the coolant flows toward heat recovery circuits external to the reactor (not shown).

Guide tubes 21 allow the drive shafts 11 of clusters 10 to pass through the collection assembly 19, without being disturbed by the turbulences of the coolant flow.

The upper internals 12 further include a flow separation device 22 having guides 23 for the clusters 10 and the drive shafts 11, disposed between core 6 and the collection assembly 19. Such upper internals 12 will not be described in greater detail since an example of such equipment may for example be found in U.S. Pat. No. 4,842,813 to which reference may be had.

The reactor further includes means 30 for guiding in-core instrumentation probes penetrating into the core through the lower part 31 of the fuel assemblies 9. Such means include guide tubes 32 each for passage of at least one glove finger 62 receiving a radiation flux measuring probe.

The guide tubes 32 project into the vessel 2 of reactor 1 through sealing sleeves 33, shown in broken lines in FIG. 1 and also described in the above-mentioned U.S. Patent. Sleeves 33 are situated above the coolant inlet nozzles 4 and outlet nozzles 5.

Tubes 32 then run to below the lower plate of core 7, typically along the external casing 13 which supports them, in the space between separation device 22 and casing 13. The guide tubes 32 are consequently distributed transversely in a zone free of the turbulences within the flow separation device 22.

In a modified embodiment, tubes 32 run outside the external casing 13 in the zone at the horizontal level of the core. Then they may be protected from the turbulences of the downward flow with plates fixed to the outside of the external casing 13.

Figure 2:
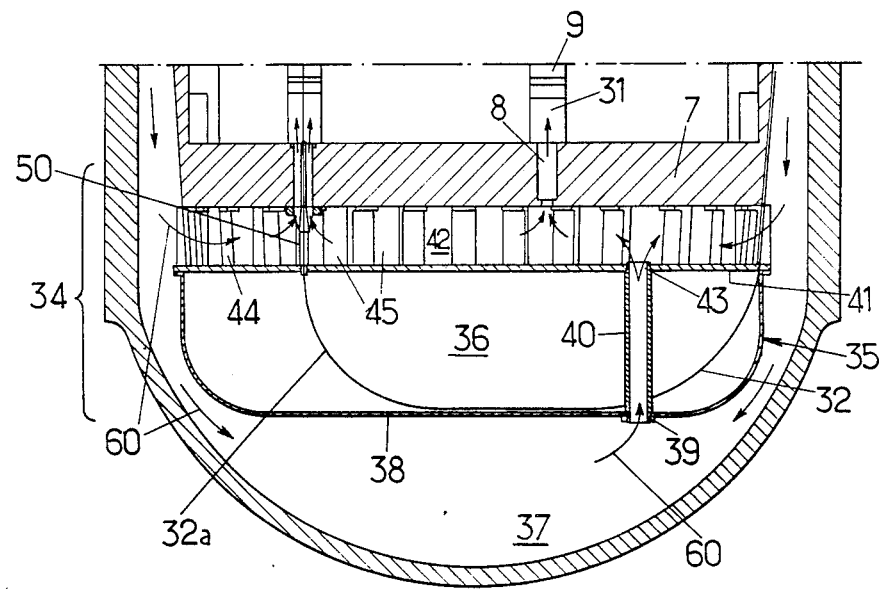
FIG. 2 is a view of the lower internals of FIG. 1 on an enlarged scale.

A further transverse distribution is then effected to distribute the probes among the fuel assemblies 9 through the lower internals 34 which will now be described more precisely with reference to FIG. 2.

For easy remote insertion and removal of a glove finger for a radiation flux measuring probe, guide tubes 32 are provided with radii of curvature sufficient for avoiding jamming.

The lower internals 34 include wall means 35 defining a volume 36 located between the core support plate 7 (from which it is separated by a distribution chamber 42 described hereinafter) and the lower part of vessel 37. The wall means 35 includes a wall 38 formed with holes 39 and ducts 40 for conveying coolant from the lower part of the vessel towards passages 8 formed in the support plate 7 (one of which is shown in FIGS. 1 and 2). The wall means is traversed by the end parts 32a of the guide tubes 32 for the in-core instrumentation probe glove fingers.

The lower internals 34 further include a separation plate 41 fixed to the wall 38 below the core support plate 7 and defining a distribution chamber 42 with said support plate. The separation plate 41 is formed with holes 43 into which the coolant-conveying ducts 40 open and is secured to the lower core support plate 7 by mechanical connection means 44 distributed at the periphery of the separation plate and mutually defining passages 45 for access of the coolant to chamber 42.

Figure 3:
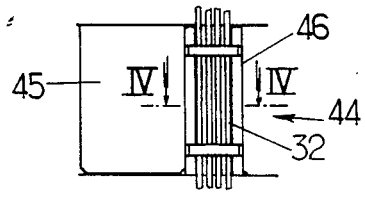
FIG. 3 shows a bar used in a particular embodiment of the invention.
Figure 4:
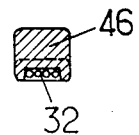
FIG. 4 is a cross-sectional view along line IV—IV of FIG. 3.

FIGS. 3 and 4 illustrate an advantageous embodiment of the mechanical connection means 44. They are formed as bars 46 shaped to limit coolant head loss and to allow guide tubes 32, for example four in number, to be fixed in the portions before insertion or penetration thereof into enclosure 36.

Figure 5:
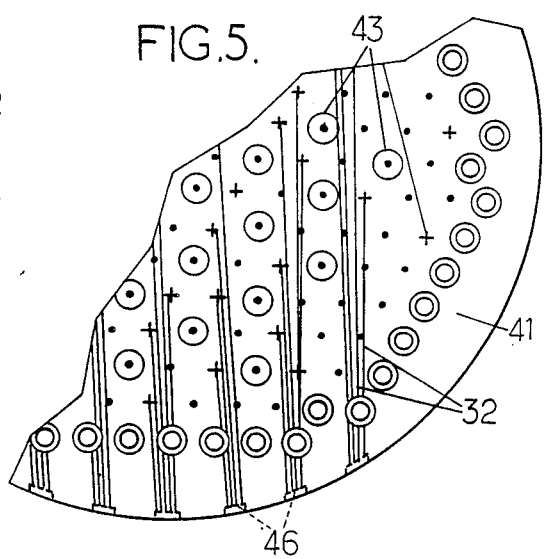
FIG. 5 is a partial schematical view from below illustrating the paths of the guide tubes under the support plate of the core.

FIG. 5 is a schematic partial bottom view illustrating a possible distribution of the paths of the guide ducts 32 for the glove fingers 62 to the assemblies and of their end parts 32a, from the bars 46.

In some cases, at least some of the guide tubes 32 are fixed to the ducts 40 inside enclosure 36.

Figure 6:
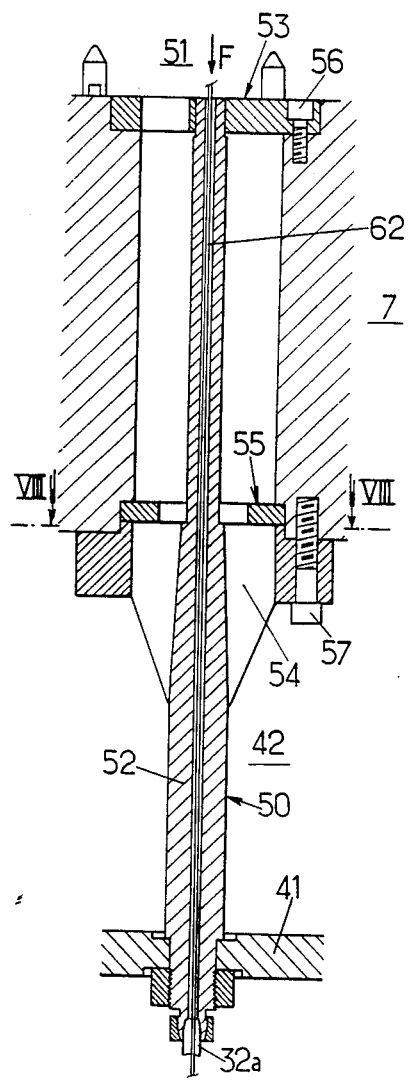
FIG. 6 is a cross-sectional view of one of the sleeves for protecting the glove fingers in a particular embodiment of the invention.
Figure 7:
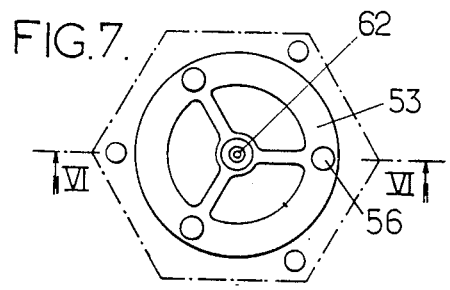
FIG. 7 is a view in the direction of arrow F of FIG. 6.
Figure 8:
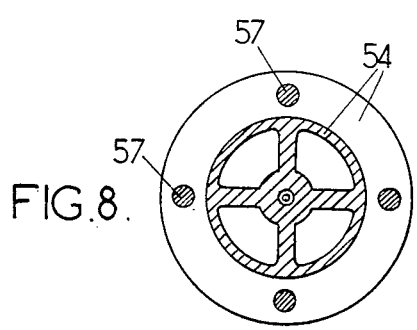
FIG. 8 is a cross-section along line VIII—VIII of the base of FIG. 6.

Referring to FIG. 6, there is shown a longitudinal cross-sectional view of a sleeve 50 for protecting the glove fingers 62 as they pass through chamber 42 towards the assembly (located at 51) adapted to receive it above the sleeve 50 which also passes through the core support plate. Sleeve 50 is fixed to the end part 32a of the guide tubes 32, for example by welding. Each sleeve includes a duct 52, a spacer 53, for example star-shaped as shown in FIG. 7, and a base 54, for example having a substantially cruciform section, as shown in cross-sectional view on FIG. 8. The spacer is for aligning duct 52 opposite the internal instrumentation tube of the assembly intended to receive the instrumentation probe glove finger. The base 54 is adapted for letting coolant flow towards the assembly. The protection sleeve may further include a diaphragm 55 for adjusting the coolant flow rate, which is clamped between base 54 and the core support plate 7. Spacer 53 and base 54 are fixed to the core support plate 7 by securing means 56, 57, of known type, for example by screws.

A nuclear reactor having lower internals as described operates as follows. Referring to FIG. 1, black solid arrows 60 indicate the path followed by the main coolant flow, at the lower part of the reactor more particularly.

The low temperature coolant enters the reactor vessel 2 through the inlet nozzles 4. The greater part of the coolant flow is deflected by the external casing 13 towards the bottom of the reactor and then enters the distribution chamber 42 directly through the passages holes 45 and through ducts 40 of the shell. The coolant then flows from chamber 42 into the fuel assemblies 9 via holes 8 formed across the core support plate 7, along protection sleeves 50 for the assemblies provided with a probe. Then it follows a conventional path through the fuel assemblies 9 of the core of the reactor.

With the device of the invention, the flow measurement probe glove fingers are guided without any risk of damage and are protected from the turbulences of the coolant until they reach the respective assemblies.

We claim:

1. In a nuclear reactor comprising: a pressure vessel; a core in said vessel, formed of upstanding fuel assemblies carried by a lower support plate formed with passages for the upward flow of a coolant, and lower internals located under the core, said lower internals including:

a horizontal separation plate situated below the core support plate and at a distance thereof for defining a distribution chamber, secured to said core support plate by mechanical connection means mutually spaced apart at the periphery of the separation plate, said mechanical connection means defining passages for radial access of the coolant to the distribution chamber, wall means situated under said separation plate and connected thereto to define a volume, a plurality of coolant ducts each connecting an opening in said wall means to a hole through said separation plate for conveying coolant from the bottom of the pressure vessel to said distribution chamber across said volume, a plurality of sleeves each secured to said separation plate and opening therethrough and each projecting upwardly through said distribution chamber into said core through a respective one of said passages in the lower support plate, and a plurality of guide tubes entering said vessel in an upper part thereof, running down below said core support plate, each passing through said volume and each having an end portion connected to a respective one of said sleeves to define a guiding circuit therewith, said guide tubes being in direct contact with the coolant in said volume.

2. Lower internals according to claim 9, wherein said mechanical connection means comprise a plurality of bars shaped for limiting pressure losses of the coolant radially flowing between said bars, and wherein said guide tubes are applied against and mechanically connected to said bars, whereby said guide tubes are protected against said coolant in a portion of said guide tubes between a downwardly extending portion thereof and a portion located in the volume.

3. Lower internals according to claim 1, wherein said ducts for conveying the coolant through said volume to said distribution chamber are spaced apart by a distance approximately equal to 1.5 times the distance separating axes of two mutually adjacent ones of said fuel assemblies.

4. Lower internals according to claim 1, wherein the guide tubes and the sleeves are adapted for receiving and guiding glove fingers until they penetrate into the core.

5. Lower internals according to claim 4, wherein each of said protection sleeves includes a conduit adapted to receive at least one glove finger, and centering means for centering said conduit within the hole for passage of the coolant to a respective one of said fuel assemblies and in alignment with an instrumentation tube in said respective assembly.

6. Lower internals according to claim 5, wherein the centering means of each of said protection sleeves include a base fixed to the support plate and spacer means fixed to a lower surface of the support plate and having a substantially cruciform cross-section defining a passage opening into the respective hole.

7. Lower internals according to claim 6, wherein at least said protection sleeve further includes a removable flow restricting diaphragm for adjusting the flow rate of the coolant, said diaphragm being clamped between the base and the core support plate.

* * * * *

UNITED STATES PATENT AND TRADEMARK OFFICE
CERTIFICATE OF CORRECTION

PATENT NO. : 4,960,561

DATED : October 2, 1990

INVENTOR(S) : Chevereau, et. al.

It is certified that error appears in the above-identified patent and that said Letters Patent is hereby corrected as shown below:

On the Title page under item [19], "Gerard" should be -- Chevereau--

Signed and Sealed this

Twenty-sixth Day of January, 1993

Attest:

STEPHEN G. KUNIN

*Attesting Officer*　　　　Acting Commissioner of Patents and Trademarks